Figure 1:
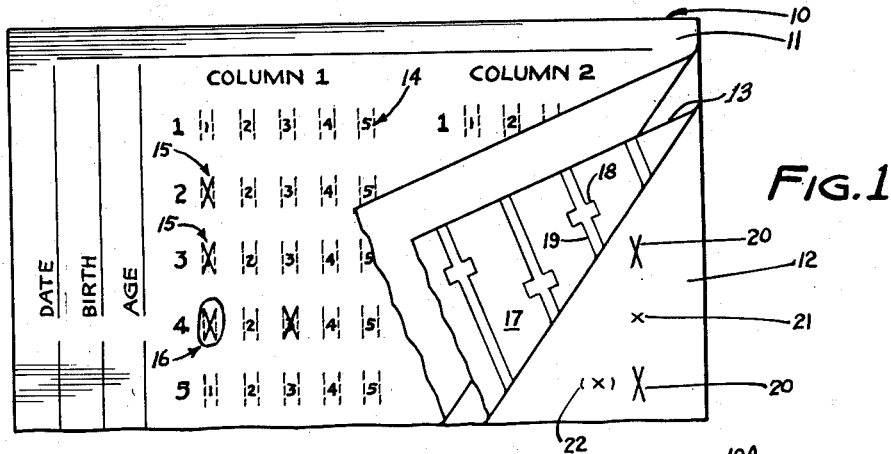

April 23, 1963    G. T. RUGLAND ETAL    3,086,300
MULTIPLE CHOICE RESPONSE DEVICE
Filed April 3, 1961

INVENTORS
GERHARD T. RUGLAND
JOHN P. YACKEL
ARTHUR P. BERGEE
By Moore, White & Deal
ATTORNEYS United States Patent Office 3,086,300
Patented Apr. 23, 1963

3,086,300
MULTIPLE CHOICE RESPONSE DEVICE
Gerhard T. Rugland, John P. Yackel, and Arthur P. Bergee, all of Box 127, Circle Pines, Minn.
Filed Apr. 3, 1961, Ser. No. 100,097
6 Claims. (Cl. 35—48)

This invention relates to an improved and simplified multiple choice response device adapted for use in the production and administration of objective tests, scales, examinations, games and the like. More particularly, this invention relates to an improved and simplified self-scoring test device adapted not only to indicate correct responses, but to indicate incorrect responses and alterations as well. The present invention constitutes an improvement over the invention described and claimed in our copending application Serial No. 770,705, now Patent No. 2,977,689, and the present application is a continuation-in-part of that application.

It is the principal object of this invention to provide a quick, accurate and easily handled multiple choice correct response recording and scoring device by the use of which any correct written answer, judgment, or choice to a test item can be readily distinguished from any incorrect answer to the same test item by virtue of the transfer of a mark or other visible signal representative of an answer from a color transfer sheet to a scoring sheet. Correct answers are indicated by one type of mark or visual signal and incorrect answers are indicated by a totally different type of mark or signal.

It is another object of this invention to provide such a test device whereby the results of the tests may be obtained quickly, conveniently and accurately by means of either hand or machine scoring by which correct responses are immediately apparent and incorrect responses or alterations in responses are indicated and readily distinguished from correct responses.

It is a further object of this invention to provide such a test device whereby the response signal is transferred from the answer marking sheet to one or more scoring sheets and made visible on the scoring sheet by the transfer of markings by means of pre-selected localized areas provided with color indicating means sensitive to application of pressure.

It is a still further object of this invention to provide a self-scoring multiple choice response test device comprising an answer sheet provided on its face with a plurality of marking stations for each of a plurality of questions and one or more other sheets underlying the answer sheet, localized areas of one of the contacting surfaces between the sheets being treated with a pressure sensitive substance adapted to transfer a marking signal upon application of pressure, said treated areas being in registry with the marking stations on the answer sheet and disposed in one predetermined pattern underlying the marking stations indicating a correct answer and in a different predetermined pattern under the remaining marking stations for each question indicating an incorrect response.

Other objects of the invention will become apparent as the description proceeds.

Figure 2:
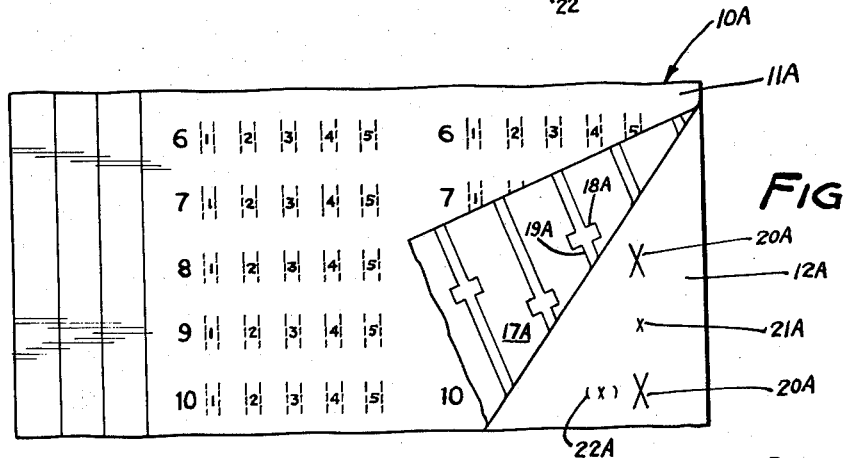
Figure 3:
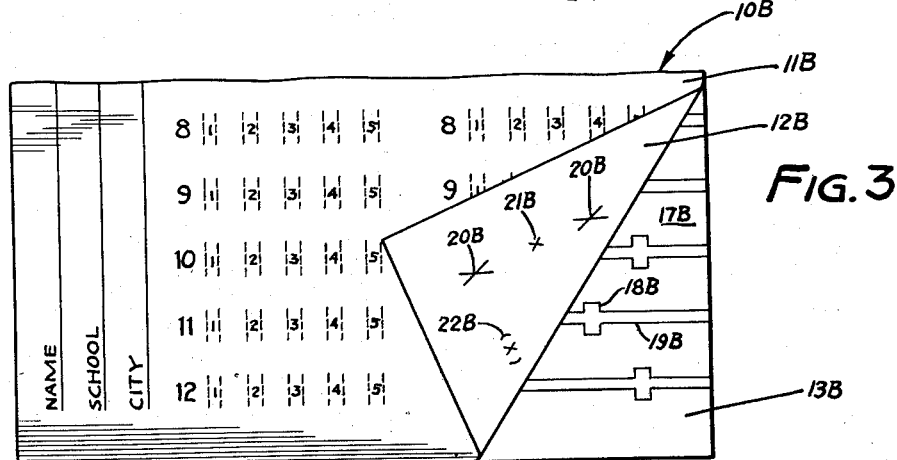

The invention is illustrated by the drawings in which the same numerals refer to corresponding parts and in which:

FIGURE 1 shows in fragmentary form the exposed face of the answer marking sheet of one form of a multiple choice response test device folded back to expose the surface of an underlying scoring sheet, the back surface of the answer sheet and the back surface of an intermediate transfer sheet bearing marking transfer material;

FIGURE 2 shows in fragmentary form the exposed face of the answer marking sheet of another form of a multiple choice response test device folded back to expose the surface of an underlying scoring sheet and the back surface of the answer sheet bearing marking transfer material; and FIGURE 3 is a fragmentary plan view of another form of test device partially folded back to expose the back surface of the answer sheet, which in this instance serves as a scoring sheet, and the top surface of a color transfer sheet.

Referring to the drawings, and particularly to FIGURE 1, the self-scoring multiple choice response test device according to this invention is indicated generally at 10 and is comprised generally of a rectangular paper answer or response marking sheet 11 and one or more underlying paper scoring sheets 12 of the same size and shape with edges in registry with the edges of the answer sheet. The marginal edges of the answer sheet and scoring sheets comprising the test device are preferably sealed together at their edges by means of glue or other adhesive or other suitable fastening means to maintain the answer sheet and scoring sheets in registry and to prevent the examinee from gaining access to the page surfaces between the sheets, and particularly to prevent access to the scoring sheet. At the same time the sheets should be readily separable for scoring of the test. These results are best accomplished by tipping the edges of the sheets with a suitable adhesive.

The exposed face surface of the answer sheet 11 is imprinted with indicia to indicate the identification of the particular test or examination, identification of the examinee, and the like. In addition the face surface of the answer sheet is provided with a plurality of marking stations indicated generally at 14. The marking stations are imprinted in any convenient pattern. The questions or test items to which a response is desired may be printed directly on the face of the answer sheet or the response marking stations may be keyed to questions or test items in a separate booklet or sheet.

The particular pattern illustrated shows the marking stations 14 disposed in a plurality of vertical columns with a horizontal row of five marking stations in each column corresponding to a numbered question. This arrangement of marking stations, of course, is adapted to the type of examination wherein the examinee is required to choose the correct response from five possible alternatives. It will be readily understood that this test device is equally adaptable to situations wherein more or fewer choices are available such as, for example, true or false type examinations wherein only two marking stations for each question would be required. The marking stations may obviously be any desired size or shape and may assume the form of square or rectangular boxes, circles, ovals and the like. They may be adapted to receive an "X," a vertical line, horizontal line, to be blocked out completely, etc. An exemplary form of marking signal is indicated at 15. A changed or corrected answer is shown at 16 and will be explained in greater detail hereinafter.

In the form of test device illustrated in FIGURE 1 the back surface of an intermediate interleaved marking or transfer sheet 13 is imprinted so as to provide pre-selected localized areas of pressure-sensitive transfer or signalling material underlying and in registry with the marking stations on the face surface of the answer sheet. The response indicating material on the back of the answer sheet is in the form of a layer of non-smudging color transfer material which produces a visible mark on the contacting face surface of the scoring sheet 12 as a result of application of pressure, as by marking one of the marking stations of the answer sheet with a pencil, ball point pen, or similar stylus means. The response indicating color transfer means on the back surface of the transfer sheet is applied in one predetermined pattern design to indicate correct responses and a different pattern design to indicate incorrect responses and alterations. As illustrated at 18, the response indicating color transfer material is applied in a pattern design corresponding generally in size and shape and in registry with the marking stations on the answer marking sheet underlying the particular marking station which corresponds to a correct response for that particular question. Thus, if, as indicated by 15 at the marking station 1 for questions 2 and 3 in column 1 of the test sheet, the examinee marks a response with an "X" or a vertical line or otherwise exerts pressure upon the paper sheet within the area defined by the marking stations and those responses are correct, they will be so indicated upon the scoring sheet by transfer of a visible mark to the scoring sheet. The transferred indication of such a correct response is shown at 20.

The response indicating transfer material is applied in a different pattern underlying those marking stations on the face of the answer sheet which correspond to incorrect answers or responses. This is shown at 19 where the response indicating material is applied in the form of a relatively narrow band extending across the scoring sheet under each of the rows of marking stations on the face of the answer sheet. Thus, if one who is being tested indicates an incorrect answer or response by applying a mark with his stylus in the marking station on the face of the answer sheet other than that corresponding to the correct answer, the result is indicated in a relatively shorter or narrower visible signal on the scoring sheet, as shown, for example, at 21. It will be seen that when using the patterns of color transfer response indicating material illustrated, correct answers are shown by a relatively larger visible mark on the scoring sheet and incorrect answers are shown by a different and relatively smaller visible mark on the scoring sheet with the result that the number of correct and incorrect responses can readily be ascertained, either manually or by machine, and the test score can be quickly determined.

If an examinee happens to be generally aware of the manner in which the responses are indicated by virtue of application of pressure by a stylus on the answer sheet and he attempts to improve his score by indicating more than one response to a question (as by applying pressure without leaving a visible mark on the face of the answer sheet with a thumbnail or a non-marking stylus), this fact is immediately apparent on the scoring sheet of the device of this invention and any such response is scored as an error.

On the other hand, if an examinee desires to change his response after he has marked any particular question, he may do so by encircling the original answer and marking a different station to indicate his answer for that question. Such a corrected response is indicated at 16 at marking station 1 of question 4 in column 1. The manner in which such a corrected response is revealed on the scoring sheet is shown at 22 where the original incorrect response and portions of the circle indicating correction are shown. If the second answer is correct, credit is given for that particular test item. If the original answer was correct, this is also readily apparent and no credit is given for that particular test item.

In order that the examinee may not discover the marking stations representative of correct answers by holding the sealed test set to the light and observing the pattern of the transfer layer, the sheet surface bearing the transfer material is provided with an opaque filler pattern 17 of a non-transferable material covering the areas between and surrounding the localized area pattern 18 and 19 of the color transfer material. The opacity of pattern 17 is about equal to that of the transfer material and they are desirably of the same color. The filler pattern may be provided in one of two ways. An overall opaque pattern may first be applied and the localized area pattern 18 and 19 of the color transfer material is applied on top of the overall layer. Alternatively, the opaque filler pattern may be applied to those areas of the sheet not to be occupied by the localized color transfer pattern and the color transfer pattern is imprinted in registry with the spaces in the filler pattern to form together an overall opaque surface coating. By either method the patterns may be applied by well known and conventional printing techniques.

The color transfer material may be any of the pressure sensitive transfer inks commonly used for imprinting manifold forms, so-called "carbon" papers and the like. Since the test answer set is intended to be used but a single time the transfer material may be applied in a relatively thin layer. It should preferably be quick drying or quick setting and should not smudge after dry or set. It may be any desired color. The filler pattern must not be subject to transfer, after setting or drying, under influence of pressure. In most instances standard printers' inks of the same color as the transfer ink produce satisfactory filler patterns.

If a test set of the type shown in FIGURE 1 with more than one scoring sheet is desired, a plurality of scoring sheets may be assembled with a single answer marking sheet in making the test devices. When this is done, extra marking or transfer sheets are interleaved between the added scoring sheets.

In the modified form of test device illustrated in FIGURE 2, indicated generally at 10A, the back surface of the answer marking sheet 11A is imprinted so as to provide the same preselected localized areas of pressure-sensitive transfer or signalling material underlying the marking stations on the face surface of the answer sheet. The face of the answer sheet is as already described. The response indicating material on the back of the answer sheet is in the form of a layer of the same non-smudging color transfer material which produces a visible mark on the contacting face surface of the scoring sheet 12A as a result of application of pressure. The opaque filler pattern 17A and color transfer pattern 18A and 19A are the same. The marks 20A, 21A and 22A indicating correct, incorrect and changed responses, respectively, are produced on the face surface of the scoring sheet upon application of pressure at the marking stations on the face surface of the answer marking sheet in the manner already indicated.

If a test set of the type shown in FIGURE 2 with more than one scoring sheet is desired, a plurality of scoring sheets may be assembled with a single answer marking sheet in making the test devices. When this is done, the back surfaces of all of the scoring sheets except the bottommost scoring sheet are provided with the transfer color material in identical pattern.

If, for any reason, it is desired that the scoring sheet be on the back of the answer sheet, this may be done, as shown in FIGURE 3, and in this event, the distinctive color markings indicating correct, incorrect or changed responses, or attempts of cheating, are formed on the back of the answer sheet. The modified form of test set is indicated generally at 10B. The face of the answer marking sheet 11B is identical to that already described. The opaque filler pattern 17B and color transfer pattern 18B and 19B are applied to the surface of a transfer sheet 13B in contact with the back surface of the answer sheet. The marks 20B, 21B and 22B indicating correct, incorrect and changed responses, respectively, are produced on the back surface of the answer marking sheet upon application of pressure at the marking stations on the face surface of that sheet. The marks are formed by transfer of color from the pattern 18B and 19B on sheet 13B. If more than one scoring sheet is desired a plurality of sheets 13B are simply used, up to the required number. The response indicating marks for the second scoring sheet are produced on the back of the first color transfer sheet 13B, and so on.

It will be apparent that the pressure sensitive response indicating transfer material must be in precise registry with the marking stations on the face of the answer sheet. This is accomplished by means well known in the printing art. Registry is maintained in the case of the forms of test device shown in FIGURES 1 and 3 by virtue of the edges of the sheet being secured together.

Instructions for evaluating scores and converting the score results to standard values and other pertinent information may be printed on the back of the answer marking sheet in the case of the device of FIGURE 1, on the back of the scoring sheet in the case of the test set of either FIGURE 1 or FIGURE 2, and on the back of the color transfer sheet in the case of the test set of FIGURE 3. In this manner scoring and tabulating can be done with a minimum of time and the resulting information can be quickly indicated on both sheets. The device of this invention is adaptable to most multiple choice question tests and to innumerable other situations where correct responses are hidden from the examinees until the examiner or judge opens the device for inspection and evaluation.

It is apparent that many modifications and variations of this invention as hereinbefore set forth may be made without departing from the spirit and scope thereof. The specific embodiments described are given by way of example only and the invention is limited only by the terms of the appended claims.

We claim:

1. A multiple choice response indicating device comprising a first paper sheet provided on its face surface with a plurality of marking stations representing responses to a plurality of multiple choice test items and at least one second paper sheet of the same size and shape as the first sheet and sealed thereto along their marginal edges, a layer of pressure sensitive color transfer material on one of the contacting surfaces between said first sheet and said second sheet, said color transfer material underlying and disposed in registry with the marking stations on the exposed face of said first sheet, said layer of color transfer material being disposed in localized preselected areas in distinct patterns representative of correct and incorrect responses respectively, said pattern representing correct responses underlying the respective marking stations corresponding to correct responses, and the pattern representing incorrect responses underlying all of the other marking stations, said localized preselected areas of the pattern representing correct responses differing in size and shape from the localized preselected areas of the pattern representing incorrect responses, a filler layer of non-transferable color material disposed in the spaces between and around said localized pattern areas of color transfer material, said filler layer being of substantially the same color and opacity as said color transfer layer.

2. A multiple choice response device according to claim 1 further characterized in that said marking stations on the first sheet are aligned in rows, said preselected localized areas of pressure sensitive color transfer material on one of the contacting surfaces between said first sheet and said second sheet underlying the marking stations corresponding to correct responses are generally the same size, shape and area as the marking stations and said preselected localized areas of color transfer material underlying all of the other marking stations are relatively narrow bands each underlying one aligned row of marking stations.

3. A multiple choice response device according to claim 2 further characterized in that said marking stations and correct response pressure sensitive color transfer areas are generally rectangular and the latter are intersected by relatively narrow bands of incorrect response pressure sensitive color transfer material extending the length of each row of marking stations.

4. A multiple choice response device according to claim 1 further characterized in that said layer of pressure sensitive color transfer material and said layer of non-transferable color material are in registry and are disposed on the back surface of an intermediate transfer sheet interleaved between the first sheet and the second whereby marks indicative of response choices are transferred to said second sheet by application of localized pressure to the marking stations on the face surface of said first sheet.

5. A self-scoring multiple choice response indicating device comprising a first paper answer marking sheet provided on its face surface with a plurality of marking stations aligned in rows each representing responses to a plurality of multiple choice test items and a second paper sheet of the same size and shape as the first sheet and sealed thereto along their marginal edges, a layer of pressure sensitive color transfer material on one of the contacting surfaces between said first sheet and said second sheet, said color transfer material being disposed to underlie and be in registry with the marking stations on the exposed surface of said first sheet, said layer of color transfer material being disposed in localized preselected areas in distinct patterns representative of correct and incorrect responses, respectively, said pattern representing correct responses underlying the respective marking stations corresponding to correct responses and having generally the same size, shape and area as the marking stations, said pattern representing incorrect responses underlying all of the other marking stations and being in the form of relatively narrow bands, each underlying one aligned row of marking stations, said localized preselected areas of the pattern representing correct responses thus differing in size and shape from the preselected areas of the pattern representing incorrect responses, a filler layer of non-transferable color material disposed in the spaces between and around said localized pattern areas of pressure sensitive color transfer material, said filler layer being of substantially the same color and opacity as the color transfer layer.

6. A multiple choice response device according to claim 5 further characterized in that said layer of pressure sensitive color transfer material and said layer of non-transferable color material are in registry and are disposed on the back surface of an intermediate transfer sheet interleaved between said first sheet and said second sheet whereby marks indicative of response choices are transferred to said second sheet by application of localized pressure to the marking stations on the face surface of said first sheet.

References Cited in the file of this patent

UNITED STATES PATENTS

| | | |
|---|---|---|
| 356,695 | Reid | Jan. 25, 1887 |
| 1,454,837 | Smith | May 8, 1923 |
| 1,829,250 | Walker | Oct. 27, 1931 |
| 2,280,409 | Keeley | Apr. 21, 1942 |